(12) United States Patent
Saguchi

(10) Patent No.: US 8,400,285 B2
(45) Date of Patent: Mar. 19, 2013

(54) KEY LOCATOR FOR ELECTRONIC KEY SYSTEM

(75) Inventor: Shinya Saguchi, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 357 days.

(21) Appl. No.: 12/940,702

(22) Filed: Nov. 5, 2010

(65) Prior Publication Data

US 2011/0109447 A1      May 12, 2011

(30) Foreign Application Priority Data

Nov. 11, 2009    (JP) .................................. 2009-258121

(51) Int. Cl.
   *B60R 25/10*        (2006.01)
(52) U.S. Cl. .................................................. 340/426.35
(58) Field of Classification Search ............. 340/426.35, 340/5.61, 5.72, 539.1, 13.24, 10.1; 307/10.1, 307/10.2

See application file for complete search history.

(56) References Cited

U.S. PATENT DOCUMENTS

| | | | |
|---|---|---|---|
| 6,208,239 B1 * | 3/2001 | Muller et al. | 340/426.35 |
| 7,230,577 B2 * | 6/2007 | Tanaka | 343/711 |
| 8,284,020 B2 * | 10/2012 | Ghabra et al. | 340/5.61 |
| 2008/0048827 A1 | 2/2008 | Nakasato et al. | |
| 2008/0157919 A1 | 7/2008 | Sugiura et al. | |
| 2010/0050713 A1 * | 3/2010 | Nagao et al. | 70/255 |

FOREIGN PATENT DOCUMENTS

| | | |
|---|---|---|
| CN | 101135209 A | 3/2008 |
| CN | 101211475 A | 7/2008 |
| JP | 2004-084406 | 3/2004 |
| JP | 2004-162477 A | 6/2004 |
| JP | 2005-076329 | 3/2005 |
| JP | 2008-106463 A | 5/2008 |

* cited by examiner

*Primary Examiner* — Phung Nguyen
(74) *Attorney, Agent, or Firm* — Patterson Thuente Pedersen, P.A.

(57) ABSTRACT

A key locator includes a first and second antenna arranged in a vehicle. A first query unit transmits a challenge from the first antenna. A second query unit transmits a challenge from the second antenna to an electronic key responding to the challenge of the first query unit. A key locating unit determines the location of the electronic key in accordance with whether responses to the challenges from the first and second antennas are received from the electronic key.

9 Claims, 8 Drawing Sheets

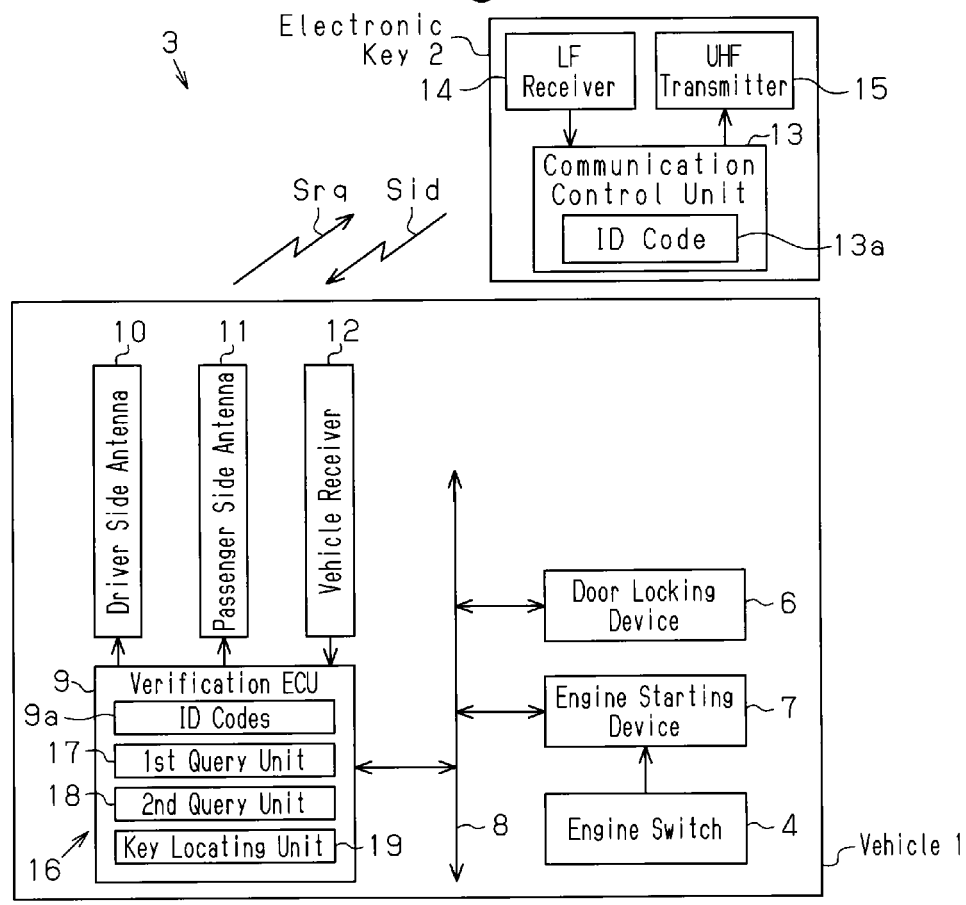
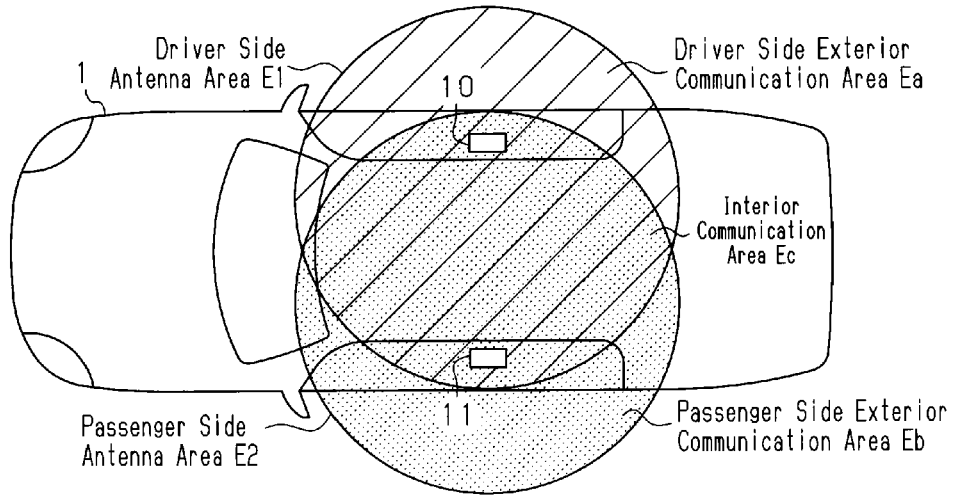

KEY LOCATOR FOR ELECTRONIC KEY SYSTEM

CROSS-REFERENCE TO RELATED APPLICATIONS

This application is based upon and claims the benefit of priority from prior Japanese Patent Application No. 2009-258121, filed on Nov. 11, 2009, the entire contents of which are incorporated herein by reference.

BACKGROUND OF THE INVENTION

The present invention relates to a key locator for an electronic key system that determines the location of an electronic key.

In the prior art, an electronic key transmits an ID code to a vehicle through wireless communication, and the vehicle verifies the ID code. One example of an electronic key system is a key-operation-free system. In a key-operation-free system, a vehicle transmits an ID code response request signal through wireless communication. In response to the request signal, an electronic key returns an ID code, and the vehicle verifies the received ID code. A key-operation-free system may include a smart entry system and a one-push engine-start system. A smart entry system enables doors to be locked or unlocked when an ID code received from an electronic key located outside the vehicle is verified. A one-push engine-start system enables the starting of the engine when an engine switch button is pushed in the vehicle after verification of an ID code received from the electronic key, which is located inside the vehicle.

FIG. 9 illustrates an example of an electronic key system installed in a vehicle 80 having doors 81 and 82. The electronic key system includes antennas 83 and 84, which are respectively arranged in the doors 81 and 82, and an electronic key 85, which responds to radio signals transmitted from the antennas 83 and 84. The transmission range of the radio signal transmitted from the antenna 83 defines a driver side antenna area 86. The transmission range of the radio signal transmitted from the antenna 84 defines a passenger side antenna area 87. In the vehicle 80, the driver side antenna 83, which is arranged near the driver side door 81, and the passenger side antenna 84, which is arranged near the passenger side door 82, sequentially transmit a request signal. Based on whether the electronic key 85 returns an ID code in response to the request signal (logic determination of response status), the vehicle 80 determines the key location (refer to Japanese Laid-Open Patent Publication Nos. 2004-84406 and 2005-76329).

For example, when the electronic key 85 responds to a request signal from the driver side antenna 83 but not to the request signal from the passenger side antenna 84, the vehicle 80 determines that the electronic key 85 is located outside the vehicle 80. Further, when the electronic key 85 responds to a request signal from the passenger side antenna 84 but not to the request signal from the driver side antenna 83, the vehicle 80 determines that the electronic key 85 is located outside the vehicle 80. When the electronic key 85 responds to the request signals from both of the driver side antenna 83 and the passenger side antenna 84, the vehicle 80 determines that the electronic key 85 is located inside the vehicle 80.

Normally, a single master key and one or more sub-keys are registered with a single vehicle 80. Thus, as shown in the state of FIG. 10, one of the plurality of electronic keys 85 may be located outside the driver side of the vehicle 80, while another is located outside the passenger side of the vehicle 80. However, in the prior art, the key location is determined based on the logic determination of the response status. Thus, the state shown in FIG. 10 results in an erroneous determination that an electronic key 85 is located inside the vehicle 80.

FIG. 11 shows a state in which electronic keys 85a, 85b, and 85c are present outside the driver side and passenger side of the vehicle 80 and inside the vehicle 80 at the same time. There are cases in which the antennas 83 and 84 transmit request signals in order of priority to electronic keys. In such a case, when an electronic key responds to a request signal sent from an antenna, that antenna would not transmit subsequent request signals to electronic keys having lower priority. For example, when the order of priority is such that the electronic key 85a is ranked first, the electronic key 85b is second, and the electronic key 85c is third, once the electronic key 85a responds to a request signal from the driver side antenna 83, the driver side antenna 83 would stop transmitting subsequent request signals. The electronic key 85a, which is located outside the passenger side antenna area 87, would not respond to a request signal from the passenger side antenna 84. However, the electronic key 85b, which is second in order of priority, would respond to a request signal from the passenger side antenna 84. This would stop transmission of subsequent request signals from the passenger side antenna 84. As a result, the vehicle 80 would not be able to recognize the electronic key 85c that is located inside the vehicle 80.

The present invention provides a device that accurately determines the location of the electronic key.

One aspect of the present invention is a key locator for an electronic key system. The key locator has a plurality of antennas arranged in a key communication subject and including a first antenna and a second antenna. The first and second antennas each form a communication area, with the communication area of the first antenna partially overlapping the communication area of the second antenna and thereby forming an overlapping communication area. The communication areas of the first and second antennas each include a non-overlapping communication area. A first query unit sends a first query from the first antenna to each of a plurality of electronic keys registered with the key communication subject. A second query unit sends a second query from the second antenna to only an electronic key that responds to the first query. A key locating unit determines the location of the electronic key in accordance with whether or not a response to the first query and the second query is received from the electronic key.

A further aspect of the present invention is an electronic key system for a vehicle. The electronic key system includes a plurality of electronic keys for the vehicle and a key locator, which is capable of performing wireless communication with the electronic keys. The key locator includes a first antenna and a second antenna capable of performing wireless communication with the electronic keys. The first and second antennas each form a communication area, with the communication area of the first antenna partially overlapping the communication area of the second antenna and thereby forming an overlapping communication area inside the vehicle. The communication areas of the first and second antennas each include a non-overlapping communication area formed at least outside the vehicle. A first query unit transmits a first query to the communication area of the first antenna from the first antenna. A second query unit transmits a second query to the communication area of the second antenna from the second antenna after the first query. The second query is generated such that the second query is correctly processed and responded to only by the electronic key that responds to the first query. A key locating unit determines whether or not there is an electronic key located inside the vehicle and whether or not there is an electronic key located outside the vehicle in accordance with whether or not a response to the first query and a response to the second query are received from the electronic key.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a schematic diagram of a key locator according to a first embodiment of the present invention;

FIG. 2 is a schematic diagram showing communication areas;

DETAILED DESCRIPTION OF THE INVENTION

Figure 3:
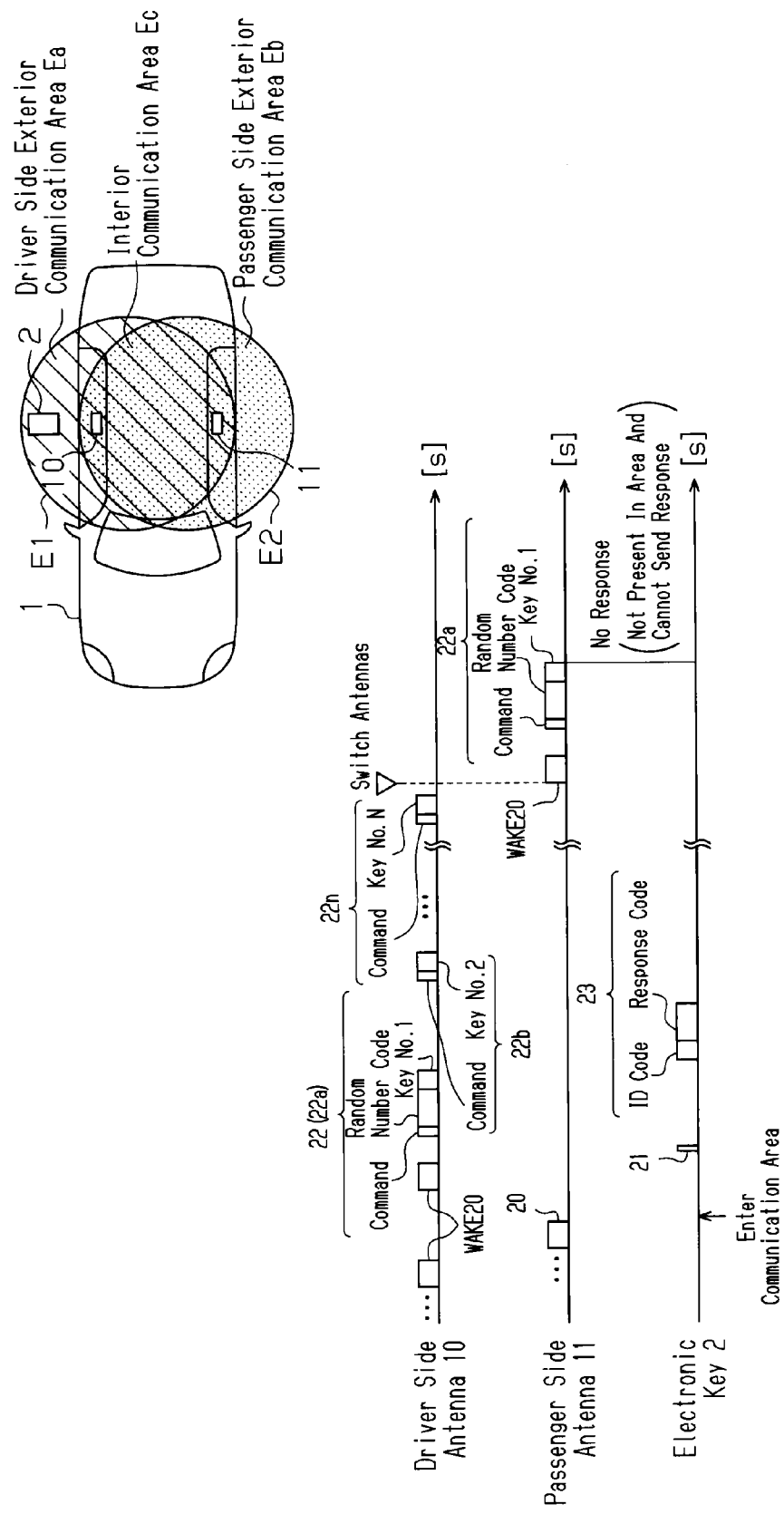
FIG. 3 is a time chart showing the determination of an electronic key location.

A key locator for an electronic key system according to a first embodiment of the present invention will now be discussed with reference to FIGS. 1 to 5.

Referring to FIG. 1, a key-operation-free system 3, which is one type of an electronic key system that performs key verification through wireless communication, is installed in a vehicle 1. The key-operation-free system 3 automatically performs identification (ID) verification when an electronic key 2 approaches the vehicle 1. The key-operation-free system 3 may include a smart entry system, which locks and unlocks doors without the need for any manual key operation, and a one-push engine-start system, which enables the engine to be started when an engine switch 4 is pushed in the vehicle 1. The vehicle 1 is one preferred example of a key communication subject.

The vehicle 1 includes a verification ECU 9, a door locking device 6, and an engine starting device 7, which are coupled to one another by an in-vehicle bus 8. The verification ECU 9 performs ID verification on the electronic key 2. The door locking device 6 manages door locking operations. The engine starting device 7 manages engine operations. The verification ECU 9, which is also referred to as a key verification device, includes a memory 9a. An ID code of the electronic key 2, which is associated with the vehicle 1, is registered in or with the memory 9a. The number of ID codes registered with the memory 9a is the same as the number of electronic keys 2 registered with the vehicle 1.

A driver side antenna 10, a passenger side antenna 11, and a vehicle receiver 12 are coupled to the verification ECU 9. The driver side antenna 10 and the passenger side antenna 11 are arranged in corresponding doors of the vehicle body. The driver side antenna 10 transmits radio signals in a low frequency (LF) band at the driver side (e.g., right side) of the vehicle 1. The passenger side antenna 10 transmits radio signals in a low frequency (LF) band at the passenger side (e.g., left side) of the vehicle 1. The antennas 10 and 11 each intermittently transmit a request signal Srq at timings or time intervals controlled by the verification ECU 9. In the illustrated example, the request signal Srq is a radio signal in the LF band. The request signal Srq may be referred to as an ID response request that is transmitted to the electronic key 2. The antennas 10 and 11 are one preferred example of a plurality of antennas including a first antenna and a second antenna. The antennas may be arranged in a vehicle exterior transmitter (not shown).

Antenna communication areas will now be described. The driver side antenna 10 forms a driver side antenna area E1 to which the request signal Srq is transmitted. The passenger side antenna 11 forms a passenger side antenna area E2 to which the request signal Srq is transmitted. The driver side antenna area E1 and the passenger side antenna area E2 are partially overlapped and form an interior communication area Ec. The interior communication area Ec may be referred to as an overlapping communication area. The region of the driver side antenna area E1 excluding the interior communication area Ec may be referred to as a driver side exterior communication area Ea. The region of the passenger side antenna area E2 excluding the interior communication area Ec may be referred to as a passenger side exterior communication area Eb. The driver side antenna area E1 and the passenger side antenna area E2 may each be simply referred to as a communication area. The driver side exterior communication area Ea and the passenger side exterior communication area Eb may each be referred to as a non-overlapping communication area. In the drawings, the communication areas are each schematically illustrated with circular contours to facilitate understanding. The actual communication areas may be set so that the interior communication area Ec substantially conforms to the shape of the vehicle interior.

The electronic key 2 includes a communication control unit 13, which controls the operation of the electronic key 2. The communication control unit 13 includes a memory 13a to which a unique ID code of the electronic key 2 is registered. The communication control unit 13 is coupled to an LF receiver 14, which receives radio signals in the LF band, and a UHF transmitter 15, which transmits radio signals in the UHF band. When the LF receiver 14 receives a request signal Srq, the communication control unit 13 transmits an ID signal Sid, which includes the ID code, on a UFH radio wave from the UHF transmitter 15. In this manner, the electronic key 2 returns the ID signal Sid in response to the request signal Srq.

The request signal Srq shown in FIG. 1 may be any signal transmitted from the vehicle 1. The ID signal Sid shown in FIG. 1 may be any signal transmitted from the electronic key 2 in response to the request signal Srq.

The verification ECU 9 intermittently transmits request signals Srq from the driver side antenna 10 and the passenger side antenna 11 to perform ID verification, or the so-called smart verification. The smart verification may be performed intermittently in controlled cycles when, for example, the engine is not running or when the vehicle 1 is parked and locked. The smart verification may also be performed when a door lock button (not shown), which is arranged on a door handle, is operated. Additionally, smart verification may be performed when detecting that the driver is entering the vehicle 1 with, for example, a courtesy switch.

The verification ECU 9 has the driver side and passenger side antennas 10 and 11 sequentially transmit the request signal Srq. Based on whether or not an ID signal Sid is returned in response to the request signal Srq transmitted from each antenna, the verification ECU 9 determines the location f the electronic key 2. Basically, the verification ECU 9 determines that the electronic key 2 is located outside the vehicle 1 when an ID signal Sid is returned in response to only one of the request signals Srq transmitted from the two antennas 10 and 11. When the ID signal Sid is returned in response to the request signals Srq from both antenna 10 and 11, the verification ECU 9 determines that the electronic key 2 is located inside the vehicle 1.

When a vehicle tuner, or vehicle receiver 12, receives an ID signal Sid from the electronic key 2 that is located outside the vehicle 1, smart communication (vehicle exterior communication) is established. In this case, the verification ECU 9 performs smart exterior verification. When the exterior verification is successful, the door locking device 6 enables or performs the locking or unlocking of the doors. Smart communication is also established when the vehicle receiver 12 receives the ID signal Sid from the electronic key 2 that is located inside the vehicle 1. In this case, the verification ECU 9 performs smart interior verification. When the interior verification is successful, the engine switch 4 (engine starting device 7) is permitted to activate the power supply and start the engine.

Figure 10:
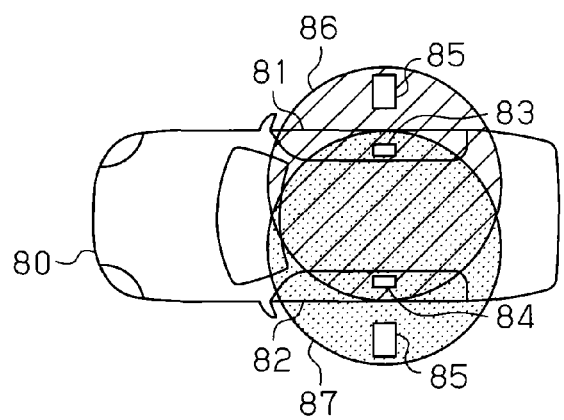
FIG. 10 is a schematic diagram showing two electronic keys located in a driver side communication area and a passenger side communication area.
Figure 11:
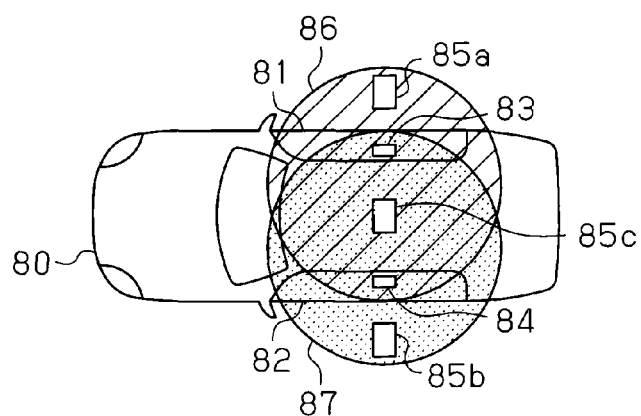
FIG. 11 is a schematic diagram showing three electronic keys located in the driver and passenger side communication areas and an interior communication area.

A plurality of electronic keys 2, such as a master key and one or more sub-keys, are registered with the vehicle 1. For example, in the state shown in FIG. 4, an electronic key 2a is located in the driver side exterior communication area Ea, and an electronic key 2b is located in the passenger side exterior communication area Eb. In the state shown in FIG. 5, the electronic key 2a is located in the driver side exterior communication area Ea, the electronic key 2b is located in the passenger side exterior communication area Eb, and an electronic key 2c is located in the interior communication area Ec. In the prior art, as described with reference to FIGS. 10 and 11, the electronic key location in the states of FIGS. 4 and 5 would be determined based on only the logic of the response status of the electronic key 2 with respect to the antennas 10 and 11. Thus, the electronic key 2 cannot be correctly determined as to whether it is located outside or inside the vehicle 1.

To solve this problem, the key-operation-free system 3 of the illustrated example includes a key locator 16. From either one of the two antennas 10 and 11, the key locator 16 sends a query to each of the electronic keys 2 registered with the verification ECU 9 (vehicle 1). Then, the key locator 16 sends a further query from the other one of the antennas 10 and 11 to only the electronic key 2 that responded to the first query. The key locator 16 determines the location of the electronic key 2 from the results of the two queries.

The key locator 16 may be incorporated in the verification ECU 9. The key locator 16 includes a first query unit 17, a second query unit 18, and a key locating unit 19. The first query unit 17 transmits a request signal Srq, namely, a query (hereinafter referred to as the first query), from either one of the two antennas 10 and 11. The first query unit 17 sends a query to all of the electronic keys 2, which are assigned with key numbers 1 to N (where N is an integer), registered with the verification ECU 9. Only the electronic key 2 located in the antenna area (E1 or E2) corresponding to the antenna that transmitted the first query responds to the first query. The first query unit 17 holds the key number of the electronic key 2 that responded to the query. That is, the first query unit 17 holds the ID code of the electronic key 2 that returned the ID signal Sid.

The second query unit 18 sends a second query from the other one of the antennas 10 and 11 to only the electronic key 2 that returned the ID signal Sid in response to the first query. The second query is configured so that only the electronic key 2 that responded to the first query can correctly process and respond to the second query. More specifically, after the first query is processed, the second query unit 18 transmits from the other one of the antennas 10 and 11 the key number of the electronic key 2 held in the first query unit 17 in result of the first query. Then, the second query unit 18 checks whether or not there is a response to the second query. Among the electronic keys 2 located in the antenna area (E1 or E2) to which the first query was transmitted, only those located in the antenna area (E2 or E1) to which the second query was transmitted respond to the second query.

The key locating unit 19 determines the key location based on the query result of the second query unit 18. When an electronic key 2 responds to the first query but not to the second query, the key locating unit 19 determines that the electronic key 2 is located outside the vehicle 1. When an electronic key 2 responds to the first query and to the second query, the key locating unit 19 determines that the electronic key 2 is located inside the vehicle 1.

The operation of the key locator 16 will now be discussed with referent to FIGS. 3 to 5. In the illustrated example, the key locator 16 determines whether an electronic key 2 is located inside or outside the vehicle 1 through a process that is similar to the so-called challenge-response authentication protocol.

FIG. 3 shows a state in which an electronic key 2 is located in only the driver side exterior communication area Ea. In this case, the driver side antenna 10 and the passenger side antenna 11 alternately transmit a wake signal 20. The wake signal 20 is a command for switching the electronic key 2 from a standby state to an activate state. When the electronic key 2 enters the driver side exterior communication area Ea and receives the wake signal 20, the electronic key 2 switches from a standby state to an active state and transmits an acknowledgement (ACK) signal 21 on a radio wave in the UHF band. The ACK signal 21 is also referred to as an affirmative response signal, which is generated in response to the wake signal 20.

Upon receipt of the ACK signal 21 within a limited time from when the wake signal 20 is transmitted, the verification ECU 9 recognizes the presence of the electronic key 2 in the vehicle proximity. Then, the first query unit 17 transmits a challenge 22 from one of the two antennas 10 and 11 (in the illustrated example, the driver side antenna 10) that transmitted the wake signal 20 resulting in the ACK signal 21. This starts the first query. The challenge 22 includes an operation command issued to the electronic key 2, a random number code used for challenge-response authentication, and a key number representing priority of the associated electronic key.

When receiving the challenge 22, the electronic key 2 performs key number verification with the key number included in the challenge 22. When key number 1 is assigned to the electronic key 2, the electronic key 2 verifies the key number upon receipt of a first challenge 22a, which is initially transmitted from the driver side antenna 10. The random number code included in the first challenge 22a is also retrieved by electronic keys that are not assigned with key number 1. However, in such an electronic key, key number verification would not be successful.

When the key number verification is successful, the electronic key 2 uses the random number code included in the first challenge 22a to compute and generate a response code. The response code is computed by running the random number code through an encryption equation, which is registered with the electronic key 2. When the response code computation is completed, the electronic key 2 generates a signal including the response code and the ID code registered with the electronic key 2. The electronic key 2 then transmits the signal on a radio wave in the UHF band as a response 23. When transmission of the response 23 is completed, the electronic key 2 returns to the original standby state from the active state.

Before transmitting the first challenge 22a, the verification ECU 9 uses its encryption key and the random number code of the first challenge 22a to compute and store its response code. When the vehicle receiver 12 receives the response 23, the verification ECU 9 verifies the ID code included in the response 23 with the ID code registered with the verification ECU 9. When this ID code verification is successful, the verification ECU 9 verifies the response code included in the response 23 with the response code the verification ECU 9 computed. When the ID code verification and the response code verification are both successful, the verification ECU 9 determines that smart verification is successful.

The first query unit 17 repeatedly transmits the challenge 22 while sequentially changing the key number to query all of the electronic keys 2 registered with the verification ECU 9. In the example of FIG. 3, subsequent to the first challenge 22a, the verification ECU 9 transmits a second challenge 22b, which includes a command and key number 2. In this manner, the verification ECU 9 repeatedly transmits the challenges 22 until transmitting an nth challenge 22n, which includes a command and key number N. The N for key number N represents the total quantity of the electronic keys 2 registered with the vehicle 1. Normally, the master key ranks first in the order of priority, and the priority becomes lower in the order of the first sub-key, the second sub-key, and so on. The key number in each challenge 22 is in correspondence with the rank in priority of the associated electronic key 2. The challenges 22 are sequentially transmitted from those including a key number with a higher rank in priority.

When receiving the response 23 to the first challenge 22a, the first query unit 17 waits until the receipt of the response 23 is completed before transmitting the second challenge 22b. If a response 23 cannot be received within a limited time from when the second challenge 22b is transmitted, the first query unit 17 transmits the next challenge as soon as the limited time elapses. Such operation is repeated for the same number of times as the key quantity. The first query unit 17 holds in its memory the key number, or ID code, of the electronic key 2 that responded to the challenge 22.

Only the first challenge 22a includes a random number code. The challenges 22b to 22n do not include random number codes and include only commands and key numbers. When a plurality of electronic keys 2 are arranged in the same single communication area, each of such electronic keys 2 receives the first challenge 22a and acquire the random number code in the first challenge 22a even if its key number is different from that of the first challenge 22a. Thus, to increase the communication throughput, the random number code is eliminated from the second and subsequent challenges 22b to 22n.

After the first query unit 17 completes the first query, the second query unit 18 switches the active antenna, or the antenna used, from the driver side antenna 10 to the passenger side antenna 11 and starts a second query for the electronic key 2 with the ID code held in the first query. The second query unit 18 first transmits the wake signal 20 so that an electronic key 2 located in the passenger side antenna E2 becomes active.

The second query unit 18 sequentially transmits challenges 22 including key numbers corresponding to the electronic keys 2 that responded to the first query. Then, the second query unit 18 checks for responses to the challenges 22. In one example, among the key numbers of the electronic keys 2 that responded to the first query, the second query unit 18 transmits challenges 22 from those with key numbers having a higher rank in priority to those with key numbers having a lower order or priority. In the example of FIG. 3, only the electronic key 2 assigned with key number 1 responded to the first query. Thus, the second query unit 18 transmits a first challenge 22a including key number 1 from the passenger side antenna 11. The second query unit 18 transmits the first challenge 22a regardless of whether or not the electronic key 2 sends an ACK signal 21 in response to a wake signal 20. In the example of FIG. 3, the electronic key 2 is not present in the passenger side antenna area E2. Thus, the second query unit 18 does not receive a response to the first challenge 22a from the electronic key 2. This fact indicates that the electronic key 2 is located in the driver side antenna area E1 but not in the passenger side antenna area E2.

The key locating unit 19 determines the location of the electronic key 2 based on the results of the first and second queries. For example, when the electronic key 2 responds only to the first query, the key locating unit 19 determines that the electronic key 2 is located outside the vehicle 1. When the electronic key 2 responds to both first and second queries, the key locating unit 19 determines that the electronic key 2 is located inside the vehicle. In the example of FIG. 3, a single electronic key 2 is present in the driver side exterior communication area Ea, and the electronic key 2 responds to only the first query. Thus, the key locating unit 19 determines that the electronic key 2 is located outside the vehicle 1.

Figure 4:
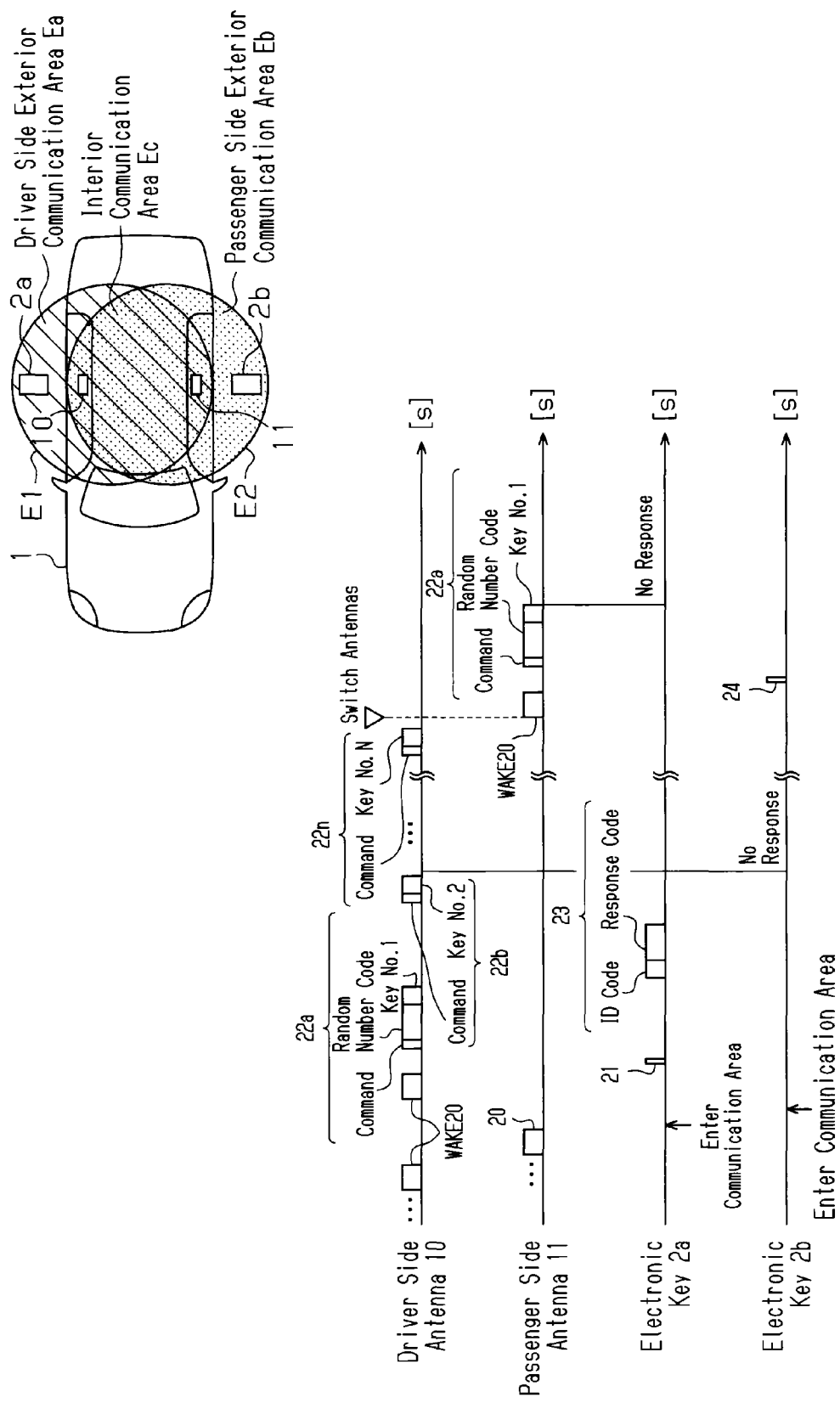
FIG. 4 is a time chart showing the determination of an electronic key location.

FIG. 4 shows a state in which a first electronic key 2a (key number 1) is located in the driver side exterior communication area Ea and a second electronic key 2b (key number 2) is located in the passenger side exterior communication area Eb. For example, the first electronic key 2a responds to a wake signal 20 transmitted from the driver side antenna 10. In this case, the first query unit 17 sequentially transmits from the driver side antenna 10 challenges 22a, 22b, . . . from those with key numbers having a higher rank in priority. This starts the first query.

Since the first electronic key 2a is located in the driver side exterior communication area Ea, the first query unit 17 receives a response to the first challenge 22a from the electronic key 2a. The first query unit 17 does not receive a response to the subsequent challenges 22b, . . . . Thus, the first query unit 17 holds the ID code of the first electronic key 2a having key number 1 that responded to the query.

After the first query is completed, the second query unit 18 uses the passenger side antenna 11 to start a second query for only electronic keys 2 that responded to the first query. In detail, the second query unit 18 transmits a wake signal 20 from the passenger side antenna 11 so that the electronic keys 2 located in the passenger side antenna area E2 become active. Then, after a predetermined time elapses, the second query unit 18 transmits a first challenge 22a from the passenger side antenna 11. In FIG. 4, the first electronic key 2a is located outside the passenger side antenna area E2 and thus does not receive the wake signal 20 and the first challenge 22a. Thus, the second query unit 18 does not receive a response to the first challenge 22a.

During the second query, the second electronic key 2b in the passenger side antenna area E2 switches to an active state in response to the wake signal 20 transmitted from the passenger side antenna 11 and thus returns an ACK signal 24. However, due to its different key number, the second electronic key 2b does not respond to the first challenge 22a. Thus, the second electronic key 2b becomes active during the second query but is irrelevant to the second query.

Accordingly, the key locating unit 19 obtains a result in which the first electronic key 2a responds to the first query but does not respond to the second query. Based on this result, the key locating unit 19 determines that the electronic key 2 is located outside the vehicle 1. In this manner, the key locating unit 19 correctly determines that the electronic key 2 is located outside the vehicle 1 and not inside the vehicle 1 even in the state of FIG. 4 in which such determination is difficult in the prior art.

Figure 5:
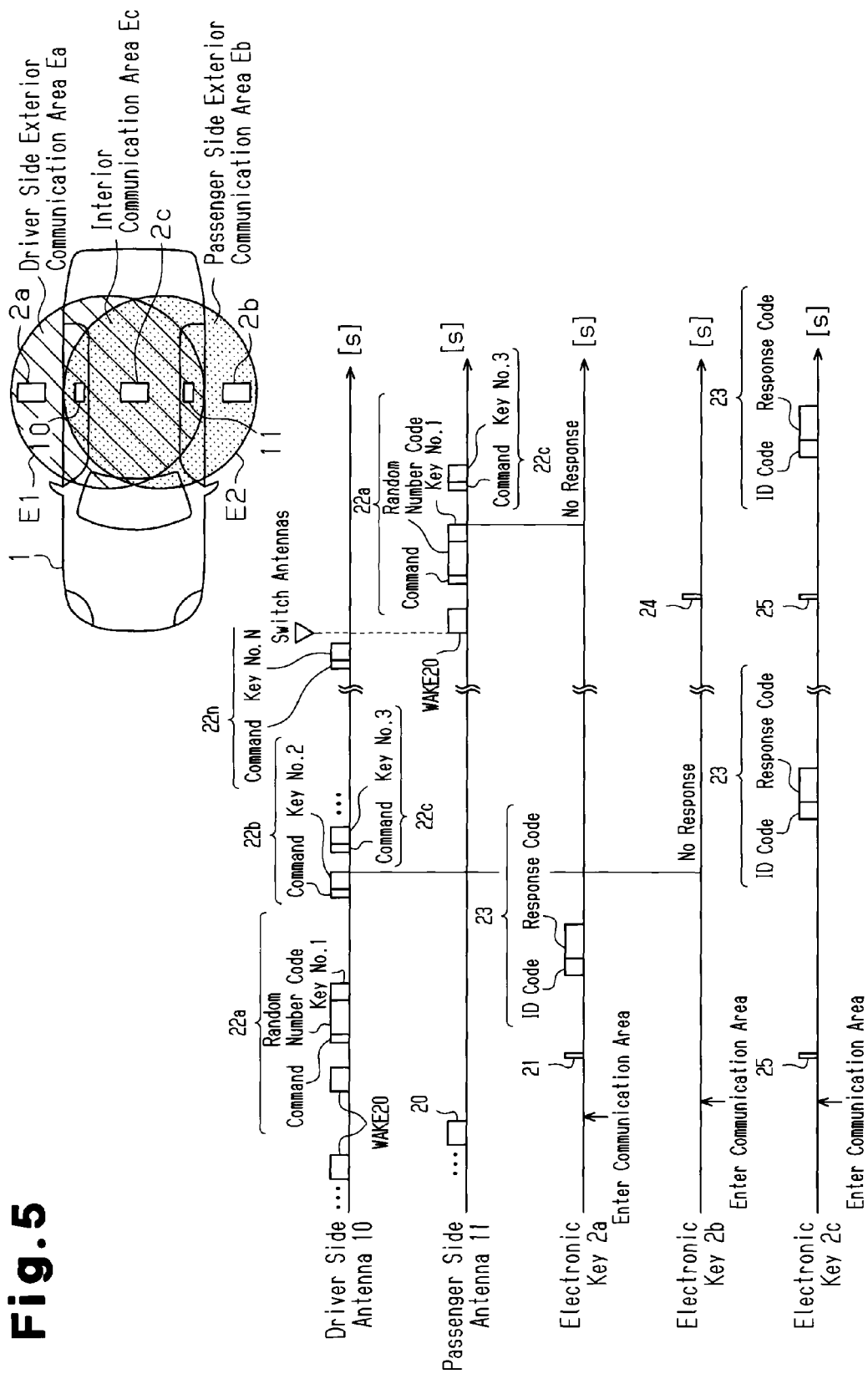
FIG. 5 is a time chart showing the determination of an electronic key location.

FIG. 5 shows a state in which the first electronic key 2a (key number 1) is located in the driver side exterior communication area Ea, the second electronic key 2b (key number 2) is located in the passenger side exterior communication area Eb, and a third electronic key 2c (key number 3) is located in the interior communication area Ec. The first electronic key 2a responds to a wake signal 20 transmitted from the driver side antenna 10. The first query unit 17 sequentially transmits from the driver side antenna 10 challenges 22a, 22b, . . . from those with key numbers having a higher rank in priority to perform the first query. Further, the third electronic key 2c becomes active when the wake signal 20 is transmitted and returns an ACK signal. The transmission of the challenge 22 may be started by the ACK signal 25.

Since the first electronic key 2a is located in the driver side exterior communication area Ea and the third electronic key 2c is located in the interior communication area Ec, the first query unit 17 receives a response to the first challenge 22a from the first electronic key 2a. Then, the first query unit 17 receives a response to the third challenge 22c from the third electronic key 2c. Thus, among the electronic keys 2a, 2b, . . . registered with the vehicle 1, the first query unit 17 holds the ID codes of the responding first and third electronic keys 2a and 2c.

After the first query is completed, the second query unit 18 uses the passenger side antenna 11 to start a second query for only the first and third electronic keys 2a and 2c that responded to the first query. The second query unit 18 transmits a wake signal 20 from the passenger side antenna 11 so that the electronic keys 2 located in the passenger side antenna area E2 become active. Then, after a predetermined time elapses, the second query unit 18 transmits from the passenger side antenna 11 challenges 22 from those with key numbers having a higher rank in priority to those with key numbers having a lower order or priority. Here, the second query unit 18 first transmits the first challenge 22a including key number 1 and then transmits the third challenge 22c including key number 3.

Further, in response to a wake signal 20 transmitted from the passenger side antenna 11, the second and third electronic keys 2b and 2c, which are located in the passenger side antenna area E2, respectively return ACK signals 24 and 25. However, the second query unit 18 starts transmitting the challenges 22a and 22c regardless of the receipt of the ACK signals 24 and 25.

The first electronic key 2a is located outside the passenger side antenna area E2 and the third electronic key 2c is located inside the passenger side antenna area E2. Thus, the second query unit 18 does not receive a response from the first electronic key 2a. The second query unit 18 receives a response from only the third electronic key 2c. Accordingly, the key locating unit 19 receives responses to both first and second queries from the third electronic key 2a. Based on this result, the key locating unit 19 determines that the electronic key 2c is located inside the vehicle 1. In this manner, the key locating unit 19 correctly determines that the electronic keys 2 are located inside and outside the vehicle 1 even in the state of FIG. 5 in which such determination is difficult in the prior art.

In the above description, among the two antennas 10 and 11, the driver side antenna 10 transmits the wake signal 20 before the passenger side antenna 11. However, the same processing is performed when the wake signal 20 is transmitted from the passenger side antenna 11 before the driver side antenna 10. Thus, a case in which the passenger side antenna 11 first transmits the wake signal 20 will not be described.

As mentioned above, the key locating unit 19 correctly determines that an electronic key 2 is located outside the vehicle 1 but not inside the vehicle 1 even in the state of FIG. 4 in which such determination is difficult in the prior art. Further, the key locating unit 19 correctly determines that the electronic keys 2 are located inside and outside the vehicle 1 even in the state of FIG. 5 in which such determination is difficult in the prior art. Thus, the key locator 16 of the present example allows for improved locating accuracy with the electronic keys 2.

The first embodiment has the advantages described below.

(1) The first query unit 17 performs a first query with the driver side antenna 10 on all of the electronic keys 2 registered with the verification ECU 9. When receiving responses to both of the first and second queries, the key locating unit 19 determines that an electronic key 2 is located in the vehicle 1. When receiving a response to only the first query, the key locating unit 19 determines that an electronic key 2 is located outside the vehicle 1. This allows for the key locator 16 to correctly determine the position of the electronic key 2 even in the states shown in FIGS. 4 and 5. This improves the accuracy for locating the electronic key 2 in comparison to the prior art.

(2) The first query unit 17 sends the first query to all of the electronic keys 2 without switching the active antenna and completes the first query using the same antenna. After the first query, the second query unit 18 performs the second query with another antenna. Since the active antenna is switched only once, the time required for determining the key location is shortened. Thus, for example, when a plurality of electronic keys 2 are located in the exterior communication areas Ea and Eb, the time required for determining the key location is shortened.

(3) The key locator 16 correctly determines whether an electronic key 2 is located inside or outside the vehicle 1. This prevents a situation in which the doors cannot be locked or unlocked even though the electronic key 2 is located in proximity to the vehicle. This also prevents a situation in which the engine cannot be started even though the electronic key 2 is located inside the vehicle 1.

(4) The key locator 16 uses two antennas, the driver side antenna 10 and the passenger side antenna 11, to determine whether the electronic key 2 is located inside or outside the vehicle 1. The antennas 10 and 11 each form a communication area extending from the vehicle exterior to the vehicle interior. This eliminates the need for a driver side exterior antenna, a passenger side exterior antenna, and a vehicle interior antenna. Thus, fewer antennas are arranged in the vehicle body.

A second embodiment will now be discussed with reference to FIGS. 6 to 8. The second embodiment differs from the first embodiment only in how the key location is determined. Thus, the basic structure of the second embodiment is the same as the first embodiment. The parts that are the same will not be described in detail, and only differing parts will be described in detail.

The key locator 16 of the second embodiment performs a first query in key units on the electronic keys 2 registered with the verification ECU 9 (vehicle 1) from one of the two antennas 10 and 11 during smart verification. When an electronic key 2 responds to the first query, the key locator 16 switches the active antenna to the other antenna and performs a second query on the electronic key 2 that responded to the first query. When there is a response to the second query, the key locator 16 determines that the electronic key 2 is located in the vehicle 1. When there is no response to the second query, the key locator 16 switches the active antenna again to the original antenna and restarts the first query. Such processing is performed for all of the registered electronic keys. A few examples will now be discussed.

Figure 6:
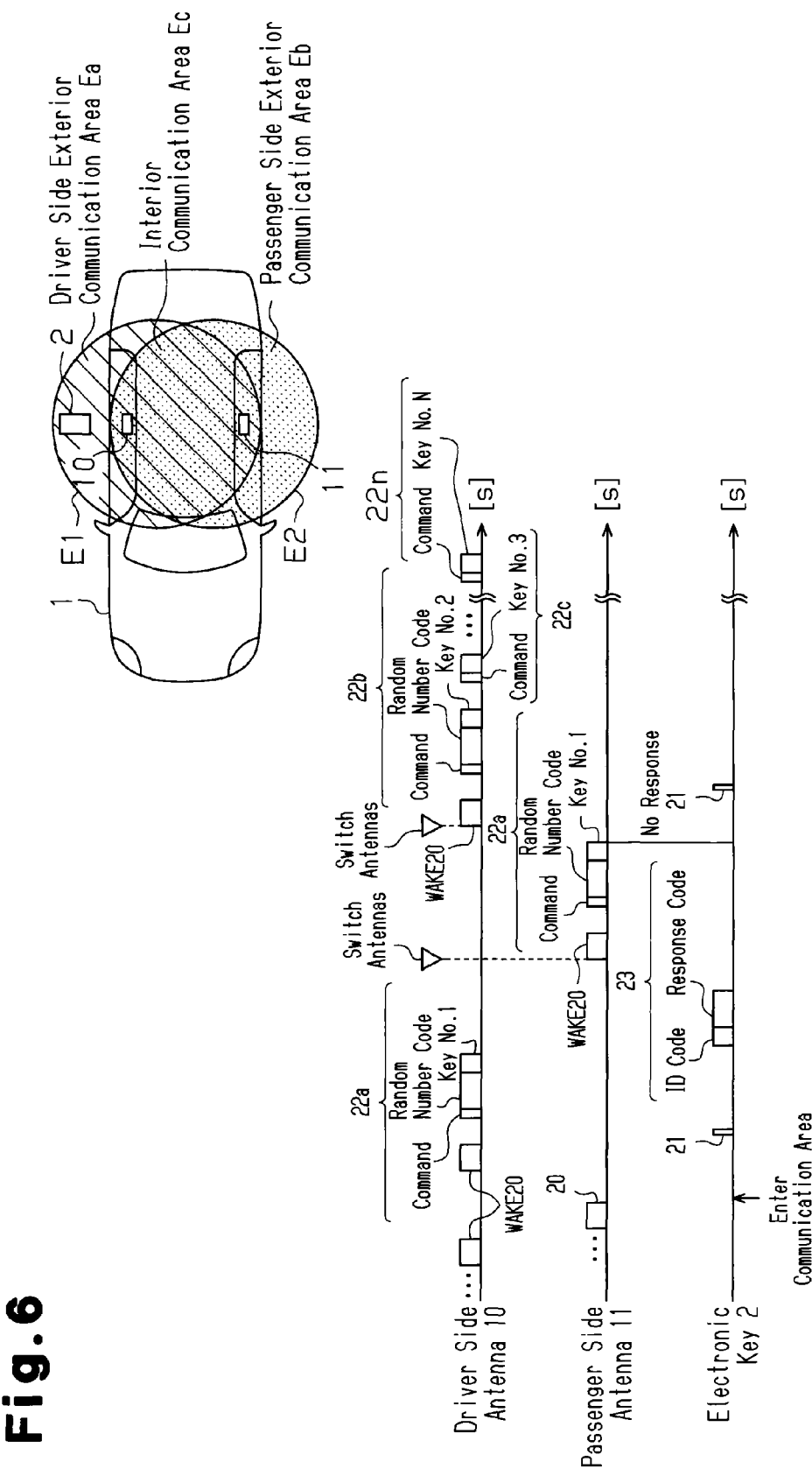
FIG. 6 is a time chart showing the determination of an electronic key location in a second embodiment of the present invention.

FIG. 6 shows a state in which an electronic key 2 (key number 1) is located in only the driver side exterior communication area Ea. In this case, for example, the driver side antenna 10 transmits a wake signal 20. Then, the first query unit 17 sequentially transmits a plurality of challenges 22a, 22b, . . . from the driver side antenna 10 and performs the first query. The challenges 22a, 22b, . . . each include a key number. The key numbers correspond to the order of priority for the electronic keys 2. The first query unit 17 transmits the challenges 22a, 22b, . . . in accordance with the order of priority. Here, the electronic key 2 with key number 1 returns an ACK signal 21 in response to the wake signal 20. This electronic key 2 has the highest rank in priority. After transmitting the first challenge 22a, the key locator 16 immediately receives a response 23 from the electronic key 2.

When receiving the response 23 from the electronic key 2, the second query unit 18 immediately switches the active antenna to the passenger side antenna 11. Then, the second query unit 18 transmits a wake signal 20 from the passenger side antenna 11 so that an electronic key 2 in the passenger side antenna area E2 would become active. After a predetermined time elapses from when the wake signal 20 is transmitted, the second query unit 18 transmits a first challenge 22a, which includes key number 1 of the electronic key 2 that responded to the first query, from the passenger side antenna 11. The second query unit 18 transmits the first challenge 22a from the passenger side antenna 11 regardless of whether or not the electronic key 2 returns an ACK signal in response to the wake signal 20.

In FIG. 6, the electronic key 2 is located outside the passenger side antenna area E2. Thus, the second query unit 18 does not receive a response to the first challenge 22a from the passenger side antenna 11. When a response to the second query is not received from the electronic key 2, the key locating unit 19 determines that the electronic key 2 is not located in the vehicle 1. Then, the key locating unit 19 returns the active antenna to the original driver side antenna 10 and restarts the transmission of the challenge 22 for the following key number and continues the subsequent query.

In this manner, the first query unit 17 re-transmits a wake signal 20 from the driver side antenna 10, waits for a predetermined time to elapse from when the wake signal 20 is transmitted, and sequentially transmits the second challenge 22b, the third challenge 22c, . . . so as to repeat transmission of the challenges 22 until completing the transmission of the nth challenge 22n. When an electronic key 2 having key number 2 is located in the driver side antenna area E1, antennas are switched before the third challenge 22c is transmitted, and the second query for key number 2 is performed in accordance with the procedures described above.

The first query unit 17 starts the transmission of the second challenge 22b regardless of the receipt of the ACK signal 21. When a response to the challenge 22 is received from the driver side antenna 10 but not from the passenger side antenna 10, the key locating unit 19 determines that the electronic key 2 is located outside the vehicle 1.

Figure 7:
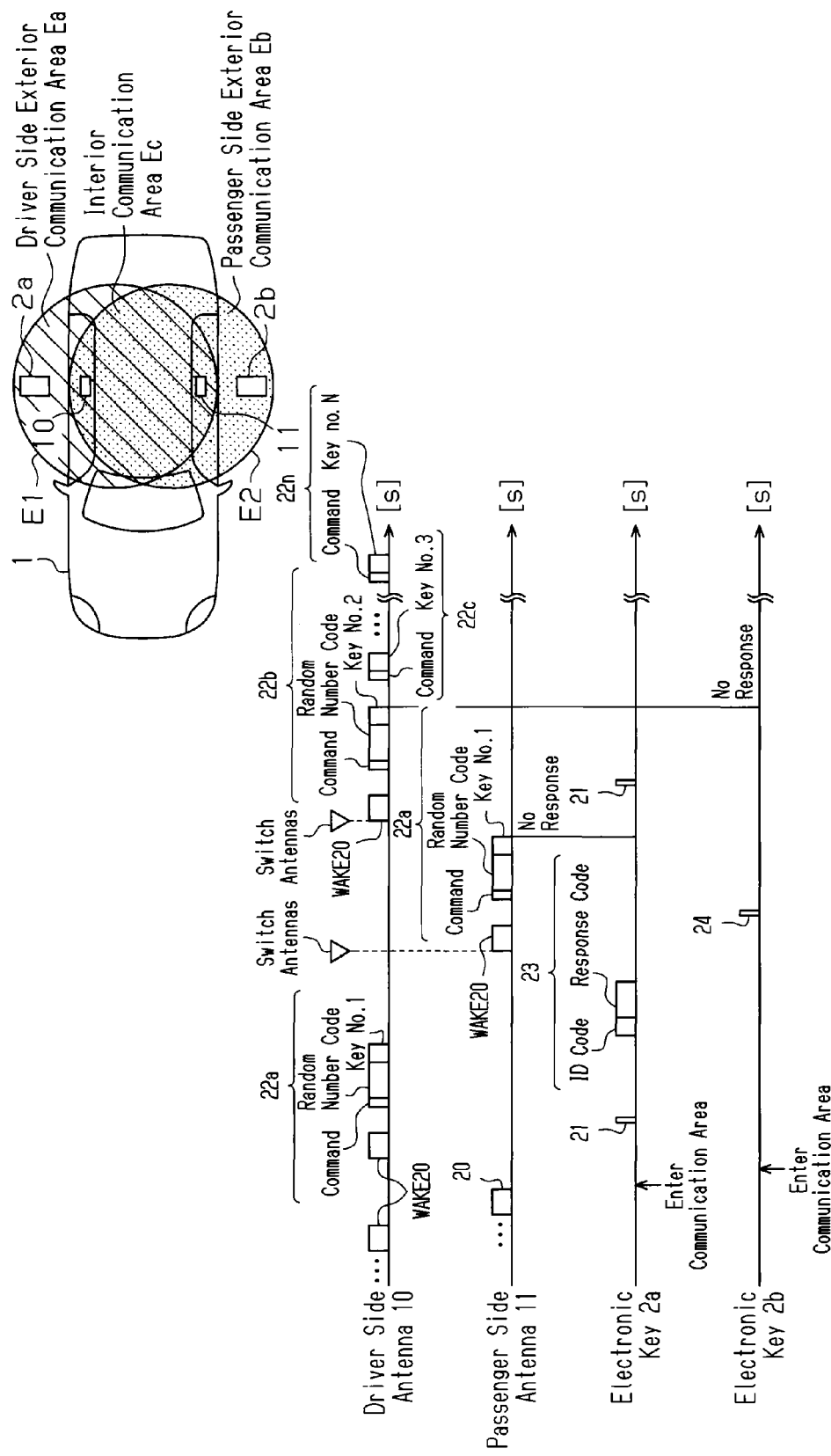
FIG. 7 is a time chart showing the determination of an electronic key location.

FIG. 7 shows a state in which a first electronic key 2a (key number 1) is located in the driver side exterior communication area Ea and a second electronic key 2b (key number 2) is located in the passenger side exterior communication area Eb. In this case, for example, the first query unit 17 transmits a wake signal 20 from the driver side antenna 10. Then, the first query unit 17 transmits a challenge 22 including a key number having the highest rank of priority from the driver side antenna 10 and starts the first query. Here, the electronic key 2a with key number 1 is located in the driver side exterior communication area Ea. Thus, after transmitting a first challenge 22a including key number 1, the first query unit 17 immediately receives a response 23 from the electronic key 2a.

When the response 23 is received from the first electronic key 2a, the second query unit 18 immediately switches the active antenna to the passenger side antenna 11. Then, the second query unit 18 transmits a wake signal 20 from the passenger side antenna 11 and re-transmits a first challenge 22a, which includes key number 1. The first electronic key 2a is located outside the passenger side antenna area E2. Thus, the first electronic key 2a does not respond to the first challenge 22a. Further, the second electronic key 2b is located inside the passenger side antenna area E2. However, key number 1 of the first challenge 22a differs from key number 2 of the second electronic key 2b. Thus, the second electronic key 2b does not respond to the first challenge. As a result, the second query unit 18 does not receive a response to the second query.

During the second query, when the wake signal 20 is transmitted from the passenger side antenna 11, the second electronic key 2b located in the passenger side antenna area E2 becomes active and returns the ACK signal 24. However, due to the different key number, the second electronic key 2b does not respond to the first challenge 22a. Thus, the second electronic key 2b becomes active during the second query but is irrelevant to the second query.

When a response to the first query is received but a response to the second query is not received, the key locating unit 19 determines that the electronic key 2 is located outside the vehicle 1. When there is no response to the second query from the electronic key 2, the key locating unit 19 switches the active antenna again to the driver side antenna 10. Then, the key locating unit 19 transmits a second challenge 22b with the key number that ranks next in the order of priority. In this manner, the challenges 22 are transmitted in accordance with the order of priority. In the example of FIG. 7, there are no electronic keys 2 that respond after the second challenge 22b. Thus, the key locator 16 determines that an electronic key 2 is not located in the vehicle 1 and located only outside the vehicle 1.

Figure 8:
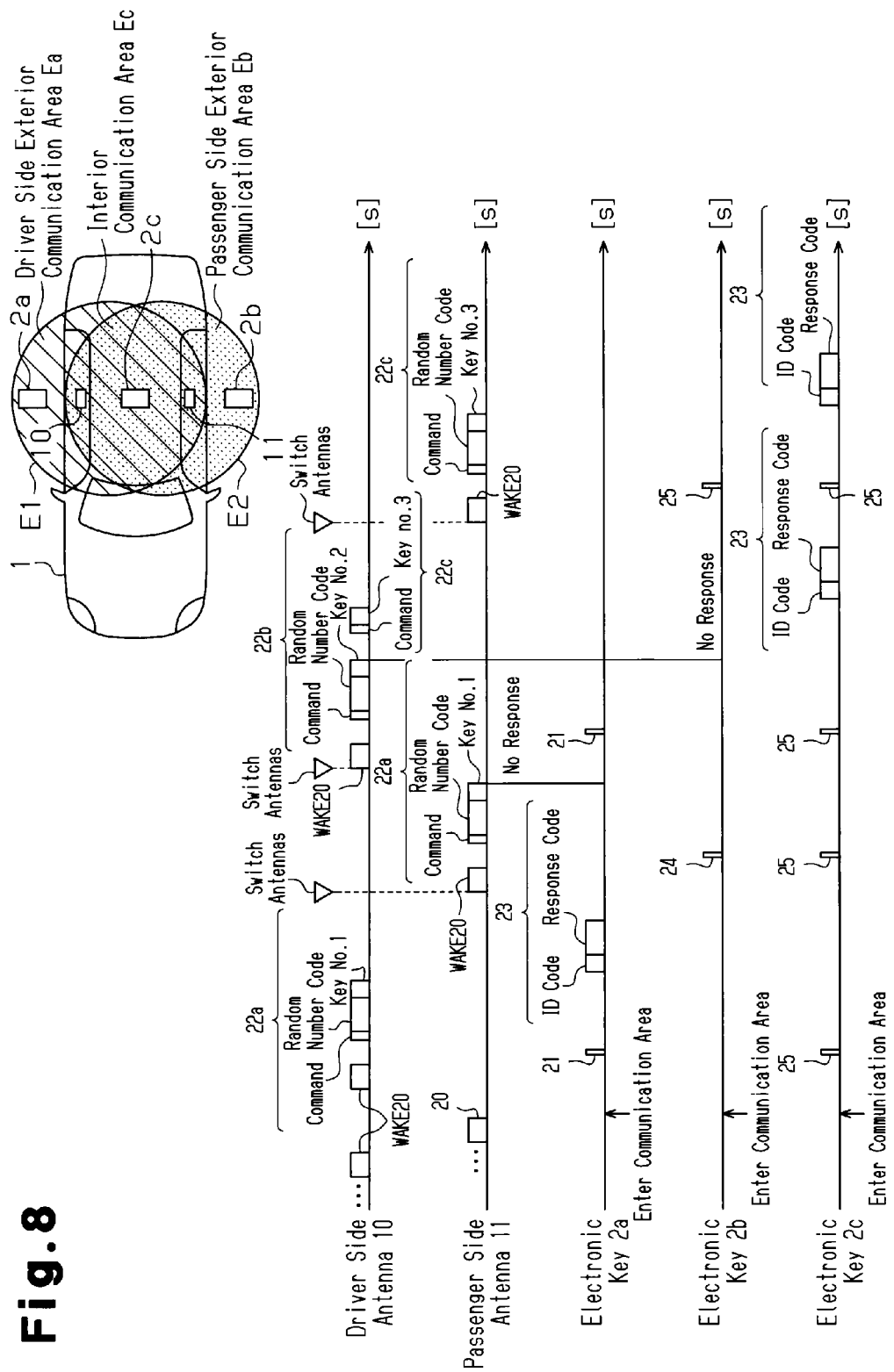
FIG. 8 is a time chart showing the determination of an electronic key location.
Figure 9:
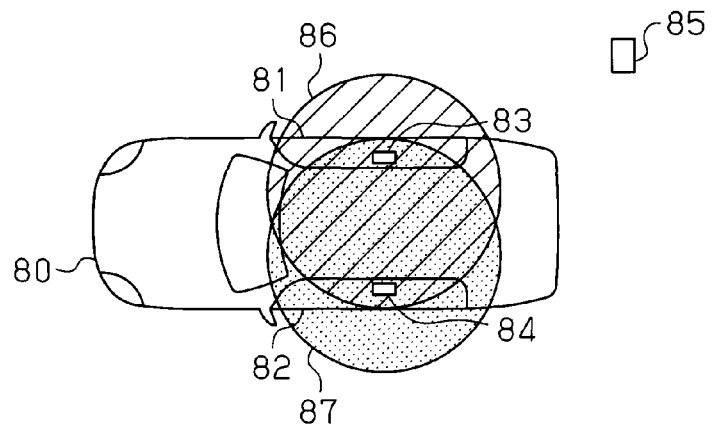
FIG. 9 is a schematic diagram showing communication areas in the prior art.

FIG. 8 shows a state in which a first electronic key 2a (key number 1) is located in the driver side exterior communication area Ea, a second electronic key 2b (key number 2) is located in the passenger side exterior communication area Eb, and a third electronic key 2c (key number 3) is located in the interior communication area Ec. In this case, the first query unit 17 transmits a wake signal 20 from the driver side antenna 10. Then, the first query unit 17 transmits a challenge 22 including a key number having the highest rank in priority from the driver side antenna 10 and starts the first query. Here, the electronic key 2a is located in the driver side exterior communication area Ea, and the electronic key 2c is located in the interior communication area Ec. However, the first query unit 17 initially receives a response to the first query from the first electronic key 2a.

When the response 23 is received from the first electronic key 2a, the second query unit 18 switches the active antenna to the passenger side antenna 11. Then, the second query unit 18 transmits the first challenge 22a. In this case, the first electronic key 2a is located outside the passenger side antenna area E2. Thus, the second query unit 18 does receive a response to the first challenge 22a with the vehicle receiver 12. In this manner the key locating unit 19 receives a response to the first query from an electronic key 2 but does not receive a response to the second query. Accordingly, the key locating unit 19 determines in this state that the electronic key 2 is located outside the vehicle 1. Then, the key locating unit 19 performs a query with the verification ECU 9 on an electronic key 2 having a key number of two or higher.

Subsequently, the first query unit 17 switches the active antenna again from the passenger side antenna 11 to the driver side antenna 10. Then, the first query unit 17 restarts the transmission from a second challenge 22b. Here, the second electronic key 2b is not located in the passenger side antenna area E1. Thus, the first query unit 17 does not receive a response to the second challenge 22b. Then, after a predetermined limited time elapses, the first query unit 17 transmits a third challenge 22c from the driver side antenna 10. The third electronic key 2c is located in the driver side antenna area E1 and thereby returns a response 23 to the third challenge 22c. Thus, the first query unit 17 receives a response to the third challenge 22c.

When the response to the third challenge 22c is received, the second query unit 18 switches the active antenna again to the passenger side antenna 11. Then, the second query unit 18 transmits the same third challenge 22c from the passenger side antenna 11. In this case, the third electronic key 2c is located inside the passenger side antenna area E2. Thus, the second query unit 18 receives a response to the third challenge 22c. Accordingly, the key locating unit 19 receives a response to the third challenge 22c in the first query and a further response to the third challenge 22c in the second query. Thus, the key locating unit 19 determines that an electronic key 2 is located inside the vehicle 1. When determining that the electronic key 2 is located inside the vehicle 1, the key locating unit 19 stops the transmission of the challenges 22 and ends the processing for determining key locations.

In this manner, the present example correctly locates the electronic keys 2 even when the electronic keys 2 are arranged in the states shown in FIGS. 7 and 8. Thus, the locations of the electronic keys 2 are accurately determined. Further, even when the quantity of electronic keys 2 registered with the vehicle 1 is increased, the determination of the key locations ends when determined that an electronic key 2 is located inside the vehicle 1. Thus, when a query is sent from the antenna 10 or 11, challenges 22 do not have to be transmitted to all of the electronic keys 2 registered with the vehicle 1. This allows for the time required for determination of key locations to be shortened.

In addition to advantages (1), (3), and (4) of the first embodiment, the present embodiment has the advantage described below.

(5) Regardless of the quantity of the electronic keys 2 registered with the vehicle 1, the time required to determine a key location is minimized when using, for example, only one electronic key 2.

It should be apparent to those skilled in the art that the present invention may be embodied in many other specific forms without departing from the scope of the invention. Particularly, it should be understood that the present invention may be embodied in the following forms.

In the first and second embodiments, the wake signal 20 may be periodically transmitted or transmitted in response to a predetermined operation.

In the first and second embodiments, the key locator 16 may be applied to detect a key that is forgotten in a vehicle.

In the first and second embodiments, when transmitting a challenge 22 during a query, the challenge 22 is transmitted regardless of the receipt of an ACK signal. However, the present invention is not limited in such a manner, and the challenge 22 may be transmitted under the condition that an ACK signal is received from the electronic key 2.

The transmission of a challenge 22 after switching antennas does not have to the performed in an unconditional manner and may be performed, for example, under the condition that an ACK signal is received in response to the wake signal 20.

In the first and second embodiments, the antennas 10 and 11 do not have to be arranged in doors and may be arranged in, for example, pillars of the vehicle body.

In the first and second embodiments, there are two antennas, the driver side antenna 10 and the passenger side antenna 11. However, the present invention is not limited to two antennas. For example, a total of three antennas may be used with one arranged in the trunk hood.

In the first and second embodiments, the key locator 16 does not necessarily have to determine whether the electronic key 2 is located inside or outside the vehicle 1. For example, the vehicle interior may be divided into a plurality of sections, and the key locator 16 may determine in which one of the sections an electronic key is located.

In the first and second embodiments, when smart verification is performed, the vehicle 1 may transmit a vehicle ID, which is an ID unique to the vehicle 1, to the electronic key 2 so that verification is performed with the vehicle ID.

In the first and second embodiments, with the key-operation-free system 3, communication from the vehicle 1 to the electronic key 2 is performed with a frequency that differs from the frequency used for communication from the electronic key 2 to the vehicle 1. However, the present invention is not limited in such a manner, and the same frequency may be used for communication in both directions.

In the first and second embodiments, the frequencies used for communication are not limited to LF and UHF, and other bands may be used.

In the first and second embodiments, when a query is sent to each electronic key 2, the electronic key 2 does not necessarily have to be specified by a key number that is included in a challenge 22. For example, a symbol may be transmitted from the vehicle 1 to specify the electronic key 2. In this manner, various schemes may be used to specify the electronic key 2.

In the first and second embodiments, the key locator 16 may be installed in equipment or devices other than a vehicle.

Technical concepts that may be recognized from the above-discussed embodiments and modifications thereof will now be described together with their advantages.

The first and second queries each include a challenge used in the challenge-response protocol to authenticate an electronic key. The challenge is transmitted subsequent to a wake signal that switches the electronic key from a standby state to an active state. Further, the challenge includes a key number to specify the electronic key that correctly processes and responds to the query. In this structure, a key number in a challenge used in the prior art specifies the electronic key that responds to the query. Thus, there is no need to add new symbols in a wireless communication signal.

The present examples and embodiments are to be considered as illustrative and not restrictive, and the invention is not to be limited to the details given herein, but may be modified within the scope and equivalence of the appended claims.

What is claimed is:

1. A key locator for an electronic key system, the key locator comprising:
a plurality of antennas arranged in a key communication subject and including a first antenna and a second antenna, in which the first and second antennas each form a communication area, with the communication area of the first antenna partially overlapping the communication area of the second antenna and thereby forming an overlapping communication area, the communication areas of the first and second antennas each including a non-overlapping communication area;
a first query unit that sends a first query from the first antenna to each of a plurality of electronic keys registered with the key communication subject;
a second query unit that sends a second query from the second antenna to only an electronic key that responds to the first query; and
a key locating unit that determines the location of the electronic key in accordance with whether or not a response to the first query and the second query is received from the electronic key.

2. The key locator according to claim 1, wherein the first query unit sends the first query to all of the electronic keys registered with the key communication subject without switching the antenna used and completes the first query using the same antenna; and
the second query unit sends the second query to only the electronic key that responded to the first query after the first query is entirely completed.

3. The key locator according to claim 1, wherein the first query unit sends the first query from the first antenna to the plurality of electronic keys in a predetermined order, and the first query unit switches the antenna used from the first antenna to the second antenna whenever receiving a response to the first query from one of the electronic keys;
the second query unit sends the second query from the second antenna to only the electronic key that responded to the first query, and the second query unit switches the antenna used from the second antenna to the first after sending the second query; and
the first query, the switching to the second antenna, the second query, and the switching to the first antenna are repeated until all of the electronic keys registered with the key communication subject undergo the queries.

4. The key locator according to claim 1, wherein the key communication subject comprises a vehicle;
the overlapping communication area is formed inside the vehicle;
each non-overlapping communication area is formed outside the vehicle; and
the key locating unit determines whether each electronic key is located inside or outside the vehicle.

5. The key locator according to claim 1, wherein the key locating unit determines whether one of the electronic keys is located in the overlapping communication area, in the non-overlapping communication area of the first antenna, or in the non-overlapping communication area of the second antenna in accordance with whether or not a response to the first query and the second query is received from said one of the electronic keys.

6. An electronic key system for a vehicle, the electronic key system comprising:
a plurality of electronic keys for the vehicle; and
a key locator capable of performing wireless communication with the electronic keys, the key locator including:
a first antenna and a second antenna capable of performing wireless communication with the electronic keys, in which the first and second antennas each form a communication area, with the communication area of the first antenna partially overlapping the communication area of the second antenna and thereby forming an overlapping communication area inside the vehicle, and the communication areas of the first and second antennas each including a non-overlapping communication area formed outside the vehicle;
a first query unit that transmits a first query to the communication area of the first antenna from the first antenna;
a second query unit that transmits a second query to the communication area of the second antenna from the second antenna after the first query, wherein the second query is generated such that the second query is correctly processed and responded to only by the electronic key that responds to the first query; and
a key locating unit that determines whether or not there is an electronic key located inside the vehicle and whether or not there is an electronic key located outside the vehicle in accordance with whether or not a response to the first query and a response to the second query are received from the electronic key.

7. The electronic key system according to claim 6, wherein the first query and second queries each include a key number corresponding to one of the electronic keys; and
the key number included in the second query corresponds to the electronic key that responded to the first query.

8. The electronic key system according to claim 6, wherein the electronic keys each have a unique ID code;
the first query and the second query each include a key number corresponding to the ID of one of the electronic keys; and
the response includes the ID code of the electronic key.

9. The electronic system according to claim 8, wherein each electronic key returns a wireless signal including its ID code as the response when the key number included in the received query corresponds to its ID code; and
when the key number included in the received query does not correspond to the ID code of the electronic key, the electronic key does not return a wireless signal including its ID code as the response to the query.

* * * * *